April 1, 1952    J. W. SEELE    2,590,896
LOCKING DEVICE
Filed Sept. 19, 1950

INVENTOR.
JEAN W. SEELE.
BY Alfred R. Fuchs
ATTORNEY

Patented Apr. 1, 1952

2,590,896

UNITED STATES PATENT OFFICE 2,590,896

LOCKING DEVICE

Jean W. Seele, Topeka, Kans.

Application September 19, 1950, Serial No. 185,668

14 Claims. (Cl. 301—9)

My invention relates to locking devices, and more particularly to a locking device for securing a demountable wheel to a hub.

The principal object of my invention is to provide a quickly and easily demountable wheel in which no nuts must be removed, and to secure the wheel tightly to the hub without using the usual studs and nuts and without relying on friction to prevent rotation of the wheel with respect to the hub.

More specifically my invention has for its purpose the securement of the demountable portion of the wheel to the hub portion thereof by means of a plurality of spring fingers that are fixed to the hub portion and adapted to be interlocked with the demountable portion of the wheel, but have a normal tendency to move out of such interlocked position. This interlocking is preferably accomplished by providing the spring fingers with enlarged ends, one of which is fixed by welding, or in any other desired manner, to the hub portion and the other of which is adapted to enter the enlarged end of a keyhole slot in the demountable portion of the wheel, with a narrow neck portion between said enlargements, which is adapted to cooperate with the reduced portion of the keyhole slot.

The arrangement is such that when the spring fingers are engaged in locking position in the keyhole slots, said fingers will each have the enlargement at one end thereof seated in the enlarged end of a keyhole slot and the enlargement at the other end thereof in face to face engagement with the outer face of the demountable portion of the wheel. This position of the spring finger is obtained by means of clamping means, such as threaded members extending from the hub portion through openings in said last mentioned enlargements and nuts engaging said enlargements that are in engagement with said threaded members, but are not removable therefrom, means being provided to prevent such removal.

It is a further purpose of my invention to provide an apparatus of the above mentioned character, in which the nuts that act to clamp the spring fingers in locking position only have to be turned one or two complete turns to permit movement of said spring fingers to a releasing position, and vice versa, approximately only one or two turns to move said spring fingers into locking position, and in which said spring fingers act as nut locking means.

With my device the number of cap screws or studs used to mount the wheel on the hub may be reduced, and since the stud nuts are never removed, they can not be misplaced. The advantage of my device over similar devices using a keyhole arrangement for wheel mounting is that friction between the wheel and the hub is not relied upon to prevent relative rotation, but instead a positive lock is provided. Because of the few turns required to loosen the stud nuts enough to remove the wheel the changing process is greatly speeded up and simplified.

Other objects and advantages of my invention will appear as the description of the drawings proceeds. I desire to have it understood, however, that I do not intend to limit myself to the particular details shown or described, except as defined in the claims.

Figure 1:
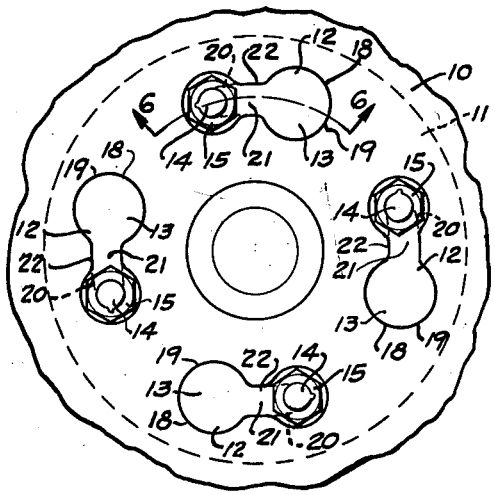
Fig. 1 is a side elevation, partly broken away, showing the outer portion of a wheel attached rigidly to the hub portion.
Figure 4:
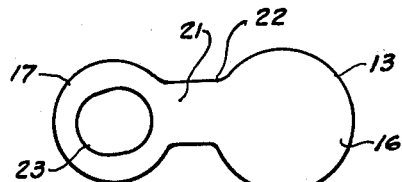
Fig. 4 shows one of the spring fingers in elevation.

My improved locking device is shown in Fig. 1 as applied to an outer portion 10 of a wheel and an inner or hub portion 11 of a wheel. An annular series of locking devices, indicated generally by the numeral 12, are provided for attaching the outer portion of the wheel 10 rigidly to the hub portion 11. The locking devices 12 consists of spring fingers 13 mounted rigidly by welding 25, or other means, on the hub portion 11 of the wheel, and clamping means consisting of studs 14 and nuts 15. Keyhole slots 18 are provided in the outer portion 10 of the wheel. The spring finger 13, as shown in Fig. 4, has enlarged ends 16 and 17. Rotation of the outer portion 10 of the wheel is prevented by a snug fit of the enlarged portion 16 of the spring finger 13 in the enlarged end 19 of the keyhole slot 18 when the parts are in the position shown in Figs. 1 and 6. The outer portion 10 of the wheel and the hub portion 11 are clamped in face to face relation by the nuts 15 and the studs 14 and the enlarged ends 17 of the spring fingers 13 when the parts are in this position.

As shown in Fig. 1, with the outer portion 10 of the wheel in the clamped position on the hub 11, the studs 14 pass through the narrow portion 20 of the keyhole slot 18. The enlarged portion 17 of the spring finger 13 is of larger diameter than the width of the narrow portion 20 of the keyhole slot 18, thus clamping the outer wheel portion to the hub portion in cooperation with the studs 14 and nuts 15. An offset 21 is provided in the reduced neck portion 22 of the spring finger 13. This reduced neck portion 22 is of substantially the same width as the narrow portion 20 of the keyhole slot so that this narrow neck portion 22 can project through the slot and locate the enlarged portion 17 of the spring finger in a position for clamping engagement with the outer portion 10 of the wheel.

Figure 2:
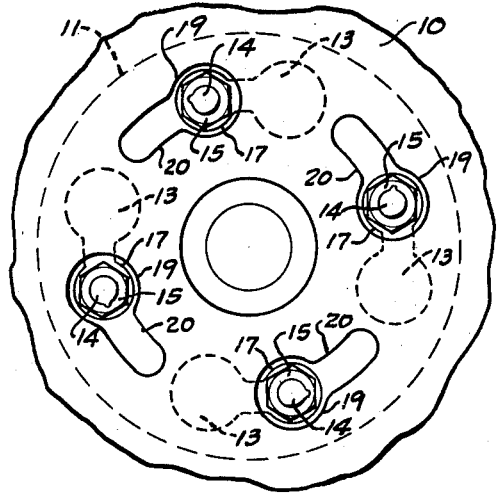
Fig. 2 is a side elevation, partly broken away, showing the outer portion of a wheel loosened from the hub and rotated for removal.

In Fig. 2 the outer portion 10 of the wheel is shown in rotated position from that shown in Fig. 1 with respect to the hub portion 11. In order to rotate the outer portion 10 of the wheel to this position the stud nuts 15 must be loosened a few turns to unclamp the enlarged portion 17 of the spring finger 13 from the face of the outer portion 10 of the wheel. The stud 14 is of substantially the same size as the narrow portion 20 of the keyhole slot 18 to allow the stud 14 to pass lengthwise through the narrow portion of the keyhole slot as the outer wheel portion 10 is rotated between the positions shown in Figs. 1 and 2. In the position shown in Fig. 2 the outer wheel portion 10 can be removed because the enlarged end 19 of the keyhole slot is substantially larger than the enlarged portion 17 of the spring finger 13.

Figure 3:
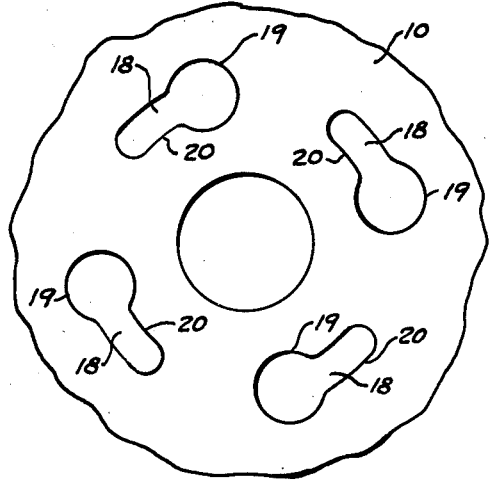
Fig. 3 is a side elevation, partly broken away, of the outer portion of a wheel completely removed from the hub.

As shown in Fig. 3, the outer portion 10 of the wheel is completely removed from the hub 11. The narrow portions of the keyhole slots 18 are shown slightly curved about the center of the wheel to provide for rotation of the outer portion 10 of the wheel on the hub 11 and still maintain a minimum of clearance between the studs 14 and the narrow portions of the slots 20. Similarly, as shown in Fig. 4, the neck portion 22 of the spring finger 13 is also slightly curved on an axis about the center of the wheel to exactly fit the keyhole slots 18. Also, as shown in Fig. 4, the enlargement 17 of the spring finger 13 is provided with an elongated opening 23, through which the stud 14 passes to allow for upward movement of the enlargement 17 as the spring finger 13 is moved to its unclamped position.

Figure 6:
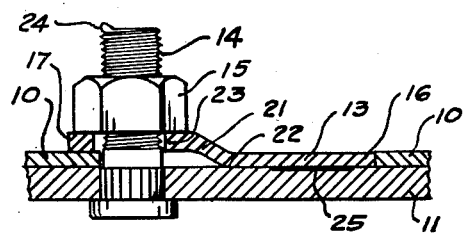
Fig. 6 is a fragmentary section through one of the spring fingers and clamping means in wheel clamping position.

As shown in Fig. 6, the enlarged portion 17 of the spring finger 13 is clamped to the side face of the outer wheel portion 10 by the stud 14 and nut 15. To prevent complete removal of the nut 15 from the stud 14 the threads are distorted at 24. In the clamped position the spring finger 13 acts as a lock washer to exert a constant pressure on the threads of the stud 14 by the nut 15.

Figure 5:
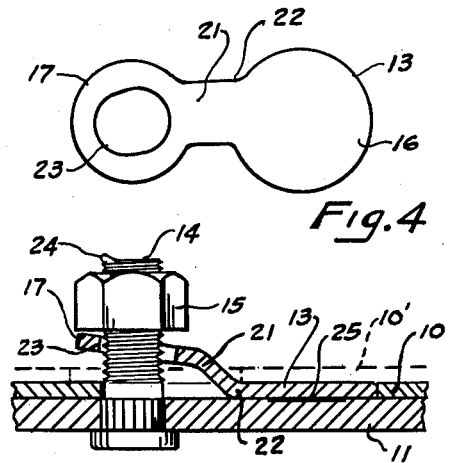
Fig. 5 is a fragmentary section through one of the spring fingers and clamping means in the loosened position, prior to rotation of the outer wheel portion to removing position.

As shown in Fig. 5, the enlargement 17 of the spring finger 13 is in unclamped position, but the outer wheel portion 10 remains in unrotated position. When the wheel portion 10 is moved to the position indicated by 10' in Fig. 4, enough to clear the spring finger 13 it may be rotated to the position as shown in Fig. 2 for removal from the hub portion 11.

In the operation of my device, the nuts 15 are loosened several turns from the studs 14, as shown in Fig. 1, to unclamp the enlargements 17 from the face of the outer wheel portion 10. The outer wheel portion 10 may then be moved away from its face to face engagement with the hub portion 11 until it will clear the enlarged end 16 of the spring finger 13. The outer wheel portion 10 may then be rotated counter-clockwise to the position shown in Fig. 2. The enlargement 17 of the spring finger 13 being smaller than the enlarged end 19 of the keyhole slot 18, the outer wheel portion 10 can then be completely removed. To engage and clamp the wheel to the hub the above procedure is reversed, the nuts 15 being screwed down on the studs 14 after the outer wheel portion 10 has been engaged with the hub portion 11, and turned to the position shown in Fig. 1, to bring the spring fingers 13 into the position shown in Fig. 6. This locks the outer wheel portion 10 firmly face to face against the hub portion 11 and also against rotation relative thereto.

What I claim is:

1. Means for locking a pair of members in face to face engagement, one of said members having a keyhole slot therein, comprising a spring finger on the other member having enlargements on opposite ends thereof and a reduced portion connecting said enlargements, and clamping means on said other member engaging said finger to hold the same in interlocking engagement with said slot and in engagement with one face of said first mentioned member.

2. Means for locking a pair of members in face to face engagement, one of said members having a keyhole slot therein, comprising a spring finger on the other member having enlargements on opposite ends thereof and a reduced portion having an offset therein connecting said enlargements, and clamping means on said other member engaging said finger to hold the same in interlocking engagement with said slot and in engagement with one face of said first mentioned member.

3. Means for locking a pair of members in face to face engagement, one of said members having a keyhole slot therein, comprising a spring finger on the other member having enlargements on opposite ends thereof, one of said enlargements being of such size as to fit the enlarged end of said keyhole slot, and a reduced portion of such width as to fit the narrow portion of said keyhole slot connecting said enlargements, and clamping means on said other member engaging said finger to hold the same in interlocking engagement with said slot and in engagement with one face of said first mentioned member.

4. Means for locking a pair of members in face to face engagement, one of said members having a keyhole slot therein, comprising a spring finger on the other member having enlargements on opposite ends thereof and a reduced portion connecting said enlargements, and clamping means comprising a stud and nut on said other member engaging said finger to hold the same in interlocking engagement with said slot and in engagement with one face of said first mentioned member.

5. Means for locking a pair of members in face to face engagement, one of said members having a keyhole slot therein, comprising a spring finger on the other member having enlargements on opposite ends thereof, one of said enlargements being of such size as to fit the enlarged end of said keyhole slot and the other enlargement being smaller than the enlarged end of said keyhole slot, and a reduced portion connecting said enlargements, and clamping means on said other member engaging said finger to hold the same in interlocking engagement with said slot and in engagement with one face of said first mentioned member.

6. Means for locking a pair of members in face to face engagement, one of said members having a keyhole slot therein, comprising a spring finger on the other member having enlargements on opposite ends thereof, one of which is provided with an elongated opening, and a reduced portion connecting said enlargements, and clamping means on said other member comprising a stud adapted to project through the narrow portion of said keyhole slot and through said elongated opening, and a nut on said stud to hold the finger in interlocking engagement with said slot and in engagement with one face of said first mentioned member.

7. Means for locking the outer portion of a wheel to the hub portion thereof, said outer portion being provided with an annular series of keyhole slots, comprising an annular series of spring fingers on said hub portion each having enlargements on opposite ends thereof and a reduced portion connecting said enlargements, and clamping means on said hub portion engaging said fingers to hold the same in interlocking engagement with said slots and in engagement with one face of the outer portion of the wheel.

8. Means for locking the outer portion of a wheel to the hub portion thereof, said outer portion being provided with an annular series of keyhole slots, comprising an annular series of spring fingers on said hub portion each having enlargements on opposite ends thereof and a reduced portion connecting said enlargements, and clamping means comprising studs and nuts on said hub portion engaging said fingers to hold the same in interlocking engagement with said slots and in engagement with one face of the outer portion of the wheel.

9. Means for locking the outer portion of a wheel to the hub portion thereof, said outer portion being provided with an annular series of keyhole slots, comprising an annular series of spring fingers on said hub portion each having enlargements on opposite ends thereof and a reduced portion having an offset therein connecting said enlargements, and clamping means on said hub portion engaging said fingers to hold the same in interlocking engagement with said slots and in engagement with one face of the outer portion of the wheel.

10. Means for locking the outer portion of a wheel to the hub portion thereof, said outer portion being provided with an annular series of keyhole slots, comprising an annular series of spring fingers on said hub portion each having enlargements on opposite ends thereof, one of said enlargements being of such size as to fit the enlarged ends of said keyhole slots, and a reduced portion connecting said enlargements of such width as to fit the narrow portions of said keyhole slots, and clamping means on said hub portion engaging said fingers to hold the same in interlocking engagement with said slots and in engagement with one face of the outer portion of the wheel.

11. Means for locking the outer portion of a wheel to the hub portion thereof, said outer portion being provided with an annular series of keyhole slots, comprising an annular series of spring fingers on said hub portion each having enlargements on opposite ends thereof, one of said enlargements being of such size as to fit the enlarged ends of said keyhole slots and the other enlargement being smaller than the enlarged ends of said keyhole slots and a reduced portion connecting said enlargements, and clamping means on said hub portion engaging said fingers to hold the same in interlocking engagement with said slots and in engagement with one face of the outer portion of the wheel.

12. Means for locking the outer portion of a wheel to the hub portion thereof, said outer portion being provided with an annular series of keyhole slots, comprising an annular series of spring fingers on said hub portion each having enlargements on opposite ends thereof, one of which is provided with an elongated opening, and a reduced portion connecting said enlargements, and clamping means on said hub portion comprising studs each adapted to project through the narrow portion of a keyhole slot and through an elongated opening, nuts on said studs to hold the fingers in interlocking engagement with said slots and in engagement with one face of the outer portion of the wheel.

13. Means for locking a pair of members in face to face engagement, one of said members having a keyhole slot therein, comprising a spring finger on the other member having enlargements on opposite ends thereof and a reduced portion connecting said enlargements, and clamping means comprising a stud and nut on said other member engaging said finger to hold the same in interlocking engagement with said slot and in engagement with one face of said first mentioned member, said stud having means thereon holding said nut against removal.

14. Means for locking the outer portion of a wheel to the hub portion thereof, said outer portion being provided with an annular series of keyhole slots, comprising an annular series of spring fingers on said hub portion each having enlargements on opposite ends thereof and a reduced portion connecting said enlargements, and clamping means comprising studs and nuts on said hub portion engaging said fingers to hold the same in interlocking engagement with said slots and in engagement with one face of the outer portion of the wheel, said studs having means thereon holding said nuts against removal.

JEAN W. SEELE.

REFERENCES CITED

The following references are of record in the file of this patent:

UNITED STATES PATENTS

| Number | Name | Date |
|---|---|---|
| 437,276 | Bauer | Sept. 30, 1890 |
| 2,077,567 | Orr | Apr. 20, 1937 |

FOREIGN PATENTS

| Number | Country | Date |
|---|---|---|
| 164,029 | Great Britain | July 8, 1920 |
| 105,706 | Sweden | Oct. 13, 1942 |